(No Model.)

J. C. SHELLITO.
NUT.

No. 360,621. Patented Apr. 5, 1887.

WITNESSES:
John A. Ellis
C. Sedgwick

INVENTOR:
J. C. Shellito
BY Munn & Co
ATTORNEYS.

ns, # UNITED STATES PATENT OFFICE.

JOHN C. SHELLITO, OF PENN RUN, PENNSYLVANIA.

NUT.

SPECIFICATION forming part of Letters Patent No. 360,621, dated April 5, 1887.

Application filed December 24, 1886. Serial No. 222,468. (No model.)

*To all whom it may concern:*

Be it known that I, JOHN C. SHELLITO, of Penn Run, in the county of Indiana and State of Pennsylvania, have invented a new and Improved Nut, of which the following is a full, clear, and exact description.

This invention relates to a novel form of nut that is designed more especially for use in connection with hollow axle-skeins, but which may be used in many other ways, the object of the invention being to provide a nut having an increased thread-surface, and consequently one that will not be readily stripped from its axle or bolt.

Reference is to be had to the accompanying drawings, forming a part of this specification, in which similar figures of reference indicate corresponding parts in both the views.

Figure 1:
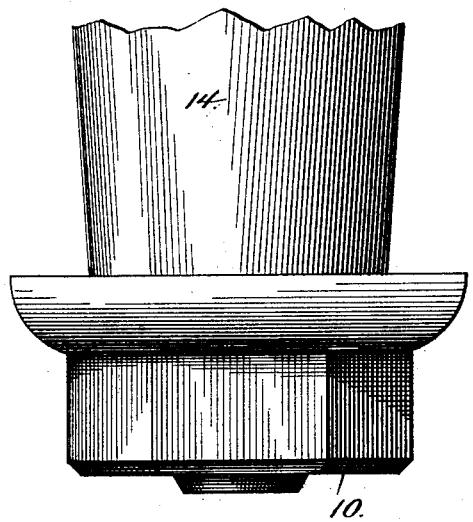
Figure 2:
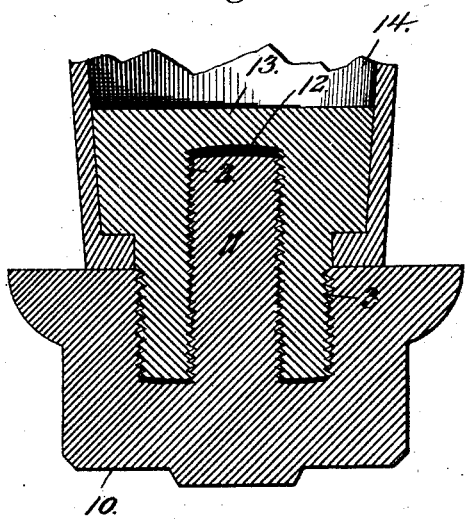

Figure 1 is a view of a portion of an axle-skein provided with my improved form of nut, and Fig. 2 is a central sectional view of the construction illustrated in Fig. 1.

In constructing such a nut as the one forming the subject-matter of this application I provide a nut, 10, having a central projection, 11, the peripheral face of which is screw-threaded, as clearly shown at 2 in Fig. 2, the usual internal thread, 3, being formed upon the nut. This projection 11 is arranged to engage with an internally-threaded socket, 12, that is formed in a plug, 13, inserted in the end of the skein 14, the projecting end of this plug being externally threaded to engage with the thread 3 of the nut 10. The threads 2 and 3 are of the same pitch, so that while the thread formed upon the projection of the nut is brought into engagement with the internal thread of the socket 12 the thread 3 may be brought into engagement with the external thread of the projection from the plug 13, as clearly shown in Fig. 2.

With such a nut as has been described I obtain more than double the amount of thread-bearing surface, and at the same time greatly stiffen and strengthen the connection between the nut and the axle, thus overcoming the danger of stripping incident to the use of the ordinary single-thread nut.

Although I have described my invention in connection with an axle, it will of course be understood that a nut of the form described could be used in many other ways.

Having thus fully described my invention, I claim as new and desire to secure by Letters Patent—

1. The combination, with a nut formed with an internal thread, 3, and an externally-threaded projection, 11, of a plug or bolt formed with an internally-threaded socket and an externally-threaded projection, substantially as described.

2. The combination, with a nut formed with an internal thread, 3, and an externally-threaded projection, 11, of an axle-skein provided with a plug having a central internally-threaded socket and an externally-threaded projection, substantially as described.

JOHN C. SHELLITO.

Witnesses:
 Jos. W. CLEMENTS,
 F. F. EMPFIELD.